March 18, 1924. 1,487,381
J. HELMS
ADJUSTABLE GROOVING DEVICE
Filed Dec. 9, 1922
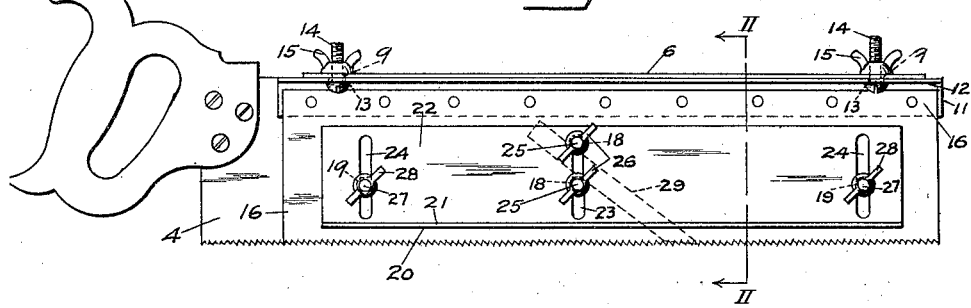
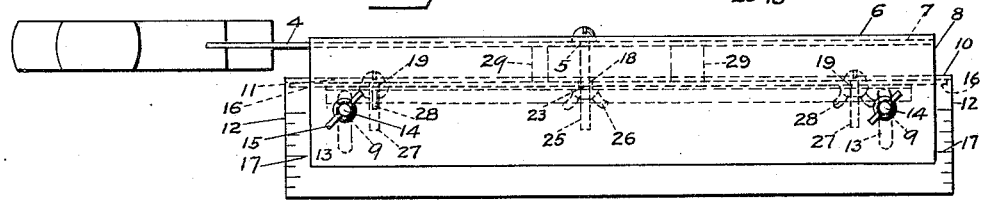
INVENTOR
ARTHUR J. HELMS.
BY R.C. Wright
ATTORNEY Patented Mar. 18, 1924.                                                  1,487,381

UNITED STATES PATENT OFFICE.

ARTHUR J. HELMS, OF PORTLAND, OREGON, ASSIGNOR OF ONE-HALF TO EDWARD J. VENNEWITZ, OF PORTLAND, OREGON.

ADJUSTABLE GROOVING DEVICE.

Application filed December 9, 1922.  Serial No. 605,990.

*To all whom it may concern:*

Be it known that I, ARTHUR J. HELMS, a citizen of the United States, residing at Portland, in the county of Multnomah and State of Oregon, have invented a new and useful Improvement in Adjustable Grooving Devices, of which the following is a specification, reference being had to the accompanying drawings.

My invention relates to saws as a class.

The object of my invention is to provide a grooving device wherein two saw blades and a chisel are combined in adjustable relation to each other to comprise, as a whole, a tool whereby a groove can be cut of desired depth and width, also a device which may be easily set for cutting grooves of various dimensions. These objects, as well as other advantages, I attain by the construction, combination and arrangement of parts illustrated in the accompanying drawings which form a part hereof.

Fig. I is a side elevation of the device set for operation.

Fig. II is a sectional view in the first figure on the line II—II.

Fig. III is a top plan view of same as in Fig. I.

Like characters refer to like parts in all figures.

There is provided a saw 4 of the common back-saw type, with back removed. The saw has a pair of openings 5 therein. An angled plate 6 has a narrow member 7 and a wider member 8, extending over the back of the saw 4 at a right angle a suitable distance, and is rigidly secured along the back in its member 7. The plate 6 has openings 9 in its member 8. A second angle plate 10 is provided. It has a narrow member 11 and a wider member 12. The member 12 has transverse slots 13, and is adjustably securable laterally along the member 8 of the plate 6, by means of bolts 14, extending through the openings 9 and slots 13, with wing nuts 15 to clamp said members in a suitable position relative to each other. A second saw 16, of similar rectangular form, is rigidly secured along its back to the member 11 of the plate 10 and depends therefrom in a parallel plane to that of the saw 4. Scales 17 may be placed upon the upper surface of the member 12 to facilitate adjusting the supported saw in a desired position related to the saw 4. The saw 16 has openings 18 and 19 therein. Alongside the outer surface of the saw 16 an angled guide plate 20 is positioned. It has a narrow member 21 and a wider member 22. The member 22 has slots 23 and 24 and is placed in engagement with the saw. The free member 21 extends outwardly at a right angle from the blade of the saw 16. Bolts 25 extend through the openings 5 of the saw 4, openings 18 of the saw 16, and slots 23 of the guide 20. Wing nuts 26 are placed upon the bolts 25. A bolt 27 extends through opening 19 of the saw 16 and slot 24 of the guide 20, and has a wing nut 28. Between the saws a chisel 29 is inserted. The saws are then spaced apart the width of the chisel and the guide 20 is positioned above the saw teeth at a distance to allow it to engage the surface of the material sawed, when the saw has cut to a pre-determined depth. When chisel and saws are thus positioned, the saws, guide and chisel are rigidly secured in the related and pre-determined positions by the bolts and wing nut clamping means described.

It will now be seen that when the device is set as illustrated and described, the saws are drawn over the material to be sawed. Thereupon they saw a groove of the proposed width and to a depth terminating when the material and the guide 20 meet in engagement. During the sawing the chisel 29 cuts out the material in the groove between the saw kerfs and to the depth of the groove pre-determined as stated. The operation is extremely simple and involves only the movements required in manipulating an ordinary saw, on the part of the operator.

Having described my invention I claim—

1. In a grooving device, the combination of, two saws of common type, having rigid angled plates on their backs, one free member of which plates is superimposed upon the opposing free member, an angled guide plate positioned alongside one of said saws, and means in and upon said saws, plates and guide to adjust and secure the saws apart, with their teeth in parallel longitudinal planes, and the guide in position to engage the surface of material when said saws have cut the same to a predetermined depth.

2. In a grooving device, the combination of, two saws of common type, having rigid angled plates on their backs, one free member of which plates is superimposed upon the other, a chisel positioned between said saws with its cutting edge in transverse alignment with the plane of the saw teeth, and means in and upon said saws to adjust and secure the same, with the chisel in said position, to allow the saws to cut a groove and the chisel to cut away the substance between the saw-kerfs simultaneously as the saws are operated upon material.

3. A grooving device having in combination, two saws of common type, having rigid angled plates on their backs, one free member of which plates is superimposed upon the opposing free member, an angled guide plate positioned alongside one of said saws, a chisel positioned between said saws with its cutting edge in transverse alignment with the plane of the saw teeth, and means in and upon said saws and guide plate to adjust and secure all of same together, with the chisel between, in positions to allow the saws to cut material and the chisel to cut away its substance between the saw-kerfs simultaneously, until the material is engaged by the guide, as a pre-determined depth of groove is attained.

ARTHUR J. HELMS.

Witnesses:
HUBERT A. COOKE,
GRACE REED.